United States Patent
Yano et al.

[15] 3,649,118
[45] Mar. 14, 1972

[54] COLOR PHOTOGRAPHY PRINTING APPARATUS

[72] Inventors: Akira Yano; Tsutomu Kimura, both of Kanagawa; Mikio Utsugi, Tokyo, all of Japan

[73] Assignee: Fuji Photo Film Co., Ltd., Kanagawa, Japan

[22] Filed: Apr. 22, 1970

[21] Appl. No.: 30,720

[30] Foreign Application Priority Data

Apr. 23, 1969 Japan..................................44/31406

[52] U.S. Cl.......................................355/38, 240/1, 350/96, 355/68, 356/222
[51] Int. Cl.........................................G03b 27/74
[58] Field of Search..........................355/38, 68, 1; 350/96; 240/1 E, 1 I; 356/222, 175–178

[56] References Cited

UNITED STATES PATENTS

| 3,245,309 | 4/1966 | Wick et al. | 355/38 X |
| 3,114,283 | 12/1963 | Gruner | 355/68 X |
| 3,170,022 | 2/1965 | Reesen | 355/38 X |

Primary Examiner—John M. Horan
Assistant Examiner—Richard A. Wintercorn
Attorney—Sughrue, Rothwell, Mion, Zinn & MacPeak

[57] ABSTRACT

A color photography printing apparatus has optical fiber bundles arranged in the vicinity of the optical path of the printing apparatus for focusing the image of the negative film onto a photographic paper. One end of the bundles faces the optical path, and the other end thereof is divided into three divisional bundles which are respectively connected with light detectors for three colors. The focusing dispersed light is detected by the light detectors in three colors with the printing light value controlled to provide a balanced color printing.

5 Claims, 7 Drawing Figures

Patented March 14, 1972

INVENTORS
AKIRA YANO
TSUTOMU KIMURA
MIKIO UTSUGI

BY Sughrue, Rothwell, Mion,
Zinn & Macpeak
ATTORNEYS

INVENTORS
AKIRA YANO
TSUTOMU KIMURA
MIKIO UTSUGI
BY Sughrue, Rothwell, Mion, Zinn & Macpeak
ATTORNEYS 3,649,118

COLOR PHOTOGRAPHY PRINTING APPARATUS

BACKGROUND OF THE INVENTION

1. Field of the Invention

The present invention relates to a color photography printing apparatus wherein the printing exposure is automatically controlled, and in particular to a color photography printing apparatus wherein the information of the density of color negative image is efficiently transmitted to a phototube or photoconductive electric element to control the exposure.

2. Description of the Prior Art

In the conventionally known type of photographic printing apparatus, there are various disadvantages. In one conventional photographic printing apparatus, the sharpness of the printed image is deteriorated by insertion of a half mirror in the optical system. In other conventionally known type of photographic printing apparatus, the accuracy of the exposure time is lowered by provision of the electromagnetic shutter near the light detector in the system, or for other reasons. As to the conventionally known type of printing apparatus for photography, a fuller description with the advantages and disadvantages thereof will be described hereinafter.

SUMMARY OF THE INVENTION

The present invention provides a color photography printing apparatus wherein the light value is not decreased and the color balance is automatically controlled.

The present invention also provides a color photography printing apparatus wherein the color balance is automatically controlled without deteriorating the sharpness of the printed image and which automatically controls the color balance with high accuracy.

BRIEF DESCRIPTION OF THE DRAWINGS

The construction and disadvantages of the conventionally known type of photographic printing apparatus will be described in detail and the advantages of the present invention will be fully described with the construction thereof in the following description taken in conjunction with the accompanying drawings.

DESCRIPTION OF THE PREFERRED EMBODIMENT

Conventional Type I

Figure 1:
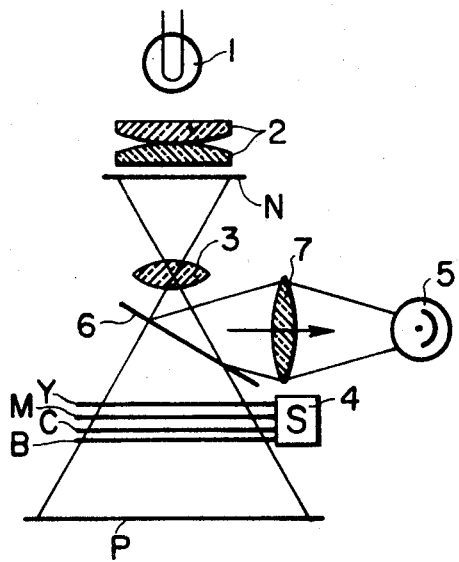
FIG. 1 is a side view of a conventionally known type of color photographic printing apparatus.

Now referring to FIG. 1 showing an example of the conventionally known type of the color photography printing apparatus, a beam splitter 6, such as a half reflecting mirror, is disposed in the focusing light path projecting the image of the negative film N onto the photographic paper P. By the beam splitter 6, the light transmitting the negative film N is partly reflected out of the light path and condensed onto the light detector 5 through condenser 7. Since this conventional method is easily constructed, this is employed for a large number of practical color printers. Since a beam splitter 6 (most of which are made of glass) is provided in the focusing light path between the negative film N and the photographic paper P, not only the sharpness of the printed image is deteriorated but also dust sticking onto the beam splitter surface lowers the quality of the printed image. And since some part of the light value from the light source through the negative film N is divided out of the focusing light, the light value of the focusing light is decreased by about 30 percent and it is necessary to increase the brightness of the light source by the decreased value. In the drawing, the reference numeral 1 indicates a printing light source, 2 indicates a condenser lens, 3 indicates a focusing lens, and 4 indicates an electromagnetic shutter for selectively placing the color filters in and out of the light path.

Conventional Type II

Figure 2:
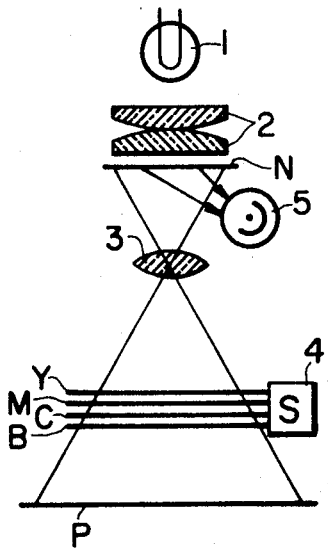
FIG. 2 is a side view of another conventionally known type of color photographic printing apparatus.

Referring to FIG. 2 showing a second type of the conventional color photography printing apparatus, the dispersed light is directed to the light detector 5 from the negative film N. The dispersed light at the negative film N is detected. In this type of printing apparatus, there is no decrease in light value as in the conventional apparatus shown in the conventional type I. Since large number of light detectors can not be arranged near the negative film N to receive the dispersed light from the negative film N in cases where the spacing between the negative film N and the focusing lens 3 is very small, the unevenness or ununiformity of the image of the negative film N affects the detection by the small number of light detectors. That is, if small number of light detectors are arranged in uniform biased distribution around the light path, the unevenness or ununiformity of the image on the film is differently detected from different directions. Accordingly, proper detection can not be effected.

And since, in general, the electromagnetic shutter 4 is disposed in the vicinity of the focusing lens 3, the light detector 5 is liable to be affected by the strong electric field made by the actuation of the electromagnetic shutter 4. Therefore, the controlled exposure time (printing time) is neither accurate nor precise. In the drawing, the reference numeral 1 indicates a light source for printing, 2 a condenser lens, 3 a focusing lens, and 4 an electromagnetic shutter for operating the color filters.

Conventional Type III

Figure 3:
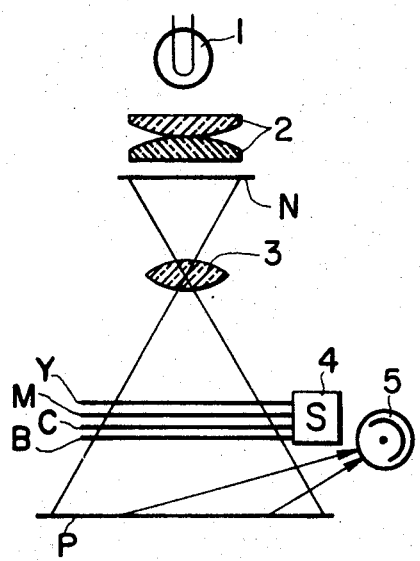
FIG. 3 is a side view of still another conventionally known type of the color photographic printing apparatus.

Referring to FIG. 3 showing the third type of the conventionally known type of the color photography printing apparatus, the reflected light from the photographic paper P is detected by the light detector 5. The light from the light source is projected onto the photographic paper through the negative film N. The reflected light from the surface of the photographic paper P is received by the light detector 5 and the light value is detected. In this type of photographic printing apparatus, the light value for printing is not decreased, in similar manner to the above-described second type of conventional apparatus. But where the color of the surface of the photographic paper P varies or reflectance thereof is varied, the detected value also varies and the color balance can not be correctly obtained. Since it is required to change the position of the light detector 5 to change the distance from the reflected surface of the paper P in order to compensate for the variation in light value due to the variation in distance between the light source and the paper P, the construction of the printing apparatus as a whole is complicated. And since the light value received by the light detector is very small, the light detector must be of high sensitivity to obtain accurate results. In the drawing, the reference numeral 1 indicates a printing light source, 2 indicates a condenser lens, 3 indicates a focusing lens, and 4 indicates an electromagnetic shutter for moving the color filters into and out of the light path.

Conventional Type IV

Figure 4:
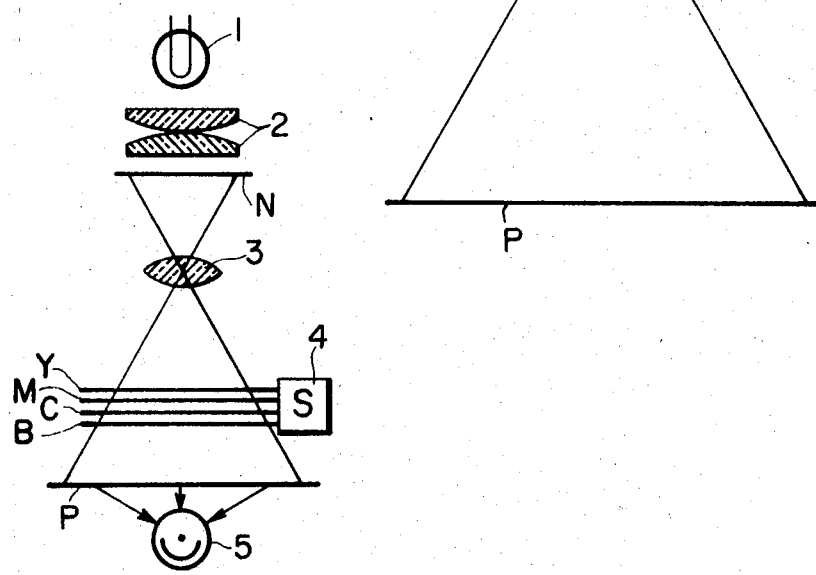
FIG. 4 is a side view of a further type of the conventional color photography printing apparatus.

Referring to FIG. 4 showing the fourth type of the conventionally known type of the color photography printing apparatus, the transmitted light through the photographic paper P is detected by a light detector 5. The light from the light source 1 is projected onto the photographic paper P through the negative film N to focus the negative image onto the paper P, and the light which is transmitted through the photographic paper P is received by the light detector 5. In this type of color photography printing apparatus, the light value for printing is not decreased as in the above-described second and third types of the conventional apparatus. But, since the light value transmitting through the paper P depends upon the thickness of the paper P, transmittance thereof and even the print on the back surface thereof, a uniform print can not be obtained. This is because the true density information of the negative film N is not correctly detected by the detector. And since the light received by the light detector should be the light from the whole surface of the photographic paper which means it depends upon the size of paper, the apparatus must include means for varying the distance between the light detector and the paper so as to compensate for the variation in light value received according to the variation in the size of the photographic paper. Furthermore, since the light value received by the light detector is very small, the light detector must be of high sensitivity to obtain accurate results. In the drawing, the reference numeral 1 indicates a printing light source, 2 indicates a condenser lens, 3 indicates a focusing lens, and 4 indicates an electromagnetic shutter for bringing the color filters into and out of the optical path of the photographic printing apparatus.

The present invention provides a color photography printing apparatus in which the above-described disadvantages in the conventionally known type of the color photography printing apparatus are all obviated. That is, the deterioration in sharpness of the printed image and reduction in light value of the printing exposure both due to the insertion of the beam splitter 6 in the optical path of printing light are obviated. The inaccuracy in density information detection due to the biased arrangement of the detectors in case of detecting the density information of a negative film having ununiform density is also obviated. Further, the lowering in accuracy of detection due to the provision of the detectors in the vicinity of the electromagnetic shutter 4, the necessity of compensating for the variation in distance between the photographic paper to be printed and the light source, the necessity of employing a light detector of high sensitivity due to the small light value reflected from or transmitted through the paper, and the inaccuracy in density detection due to the difference in reflectance or transmittance of the paper are all obviated as well.

In order to obviate the disadvantages as described just above, the color photography printing apparatus in accordance with the present invention is provided with light detectors at the remote positions and at one end of the optical fibers. The other end of the optical fibers are located around the light detectors' path of the printing optical system so as to receive the dispersed light from the negative film N disposed in the optical system. The optical fibers for transmitting the dispersed light to the light detectors are formed into an optical fiber bundle which has an end divided into three smaller bundles for three colors.

Figure 5:
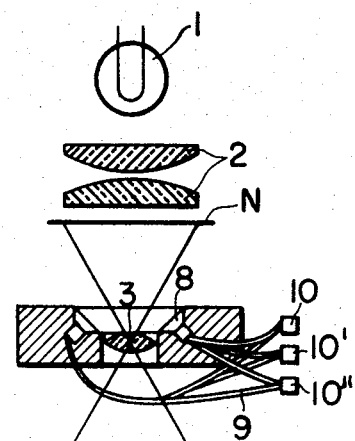
FIG. 5 is a side view of the color photography printing apparatus in accordance with the present invention.
Figure 6:
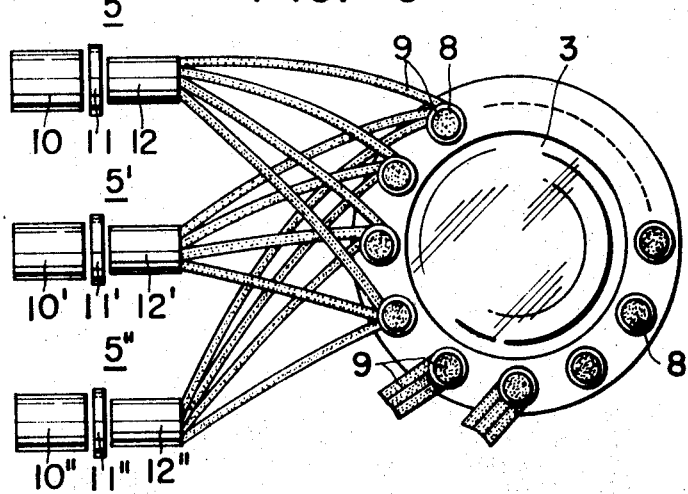
FIG. 6 is a fragmental plan view of the main part of the color photography printing apparatus in accordance with the present invention showing the arrangement of the light detector for detecting the density information of the negative film image.
Figure 7:
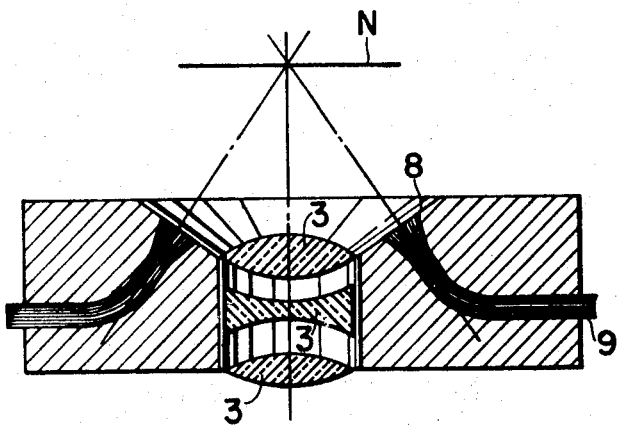
FIG. 7 is a cross sectional view of the main part of the color photography printing apparatus in accordance with the present invention showing the relation of the optical fiber bundle with the optical path of the system.

Now the color photography printing apparatus in accordance with the present invention will be described in detail referring to FIGS. 5 through 7 showing an embodiment of the present invention.

Referring to FIG. 5, schematically showing the construction of the printing apparatus of the present invention, the light from the light source 1 is projected onto the photographic paper P through the condenser lenses 2, negative film N and the projection lens 3. Most of the light transmitted through the negative film N is projected onto the photographic paper P in a focused image, but some of the light is dispersed out of the optical path. Accordingly, some of the light transmitted through the negative film N is dispersed out of the aperture of the projection lens 3. In order to receive the dispersed light, light receiving elements are arranged around the projection lens 3. The light receiving elements 8 are faced toward the light source 1. The light receiving element 8 may be in the form of a conical, concave plate or may be a block member having a conical recessed surface. At the bottom of the recess, that is, the position where the received light is condensed, one end of an optical fiber bundle is disposed. The other end of the optical fiber bundle 9 is divided into three divisional bundles. The respective ends of the divisional bundles are connected to three light detectors, 5, 5', 5'', respectively. The three divisional bundles transmit the light for detection of three colors, red, green and blue, respectively. The light receiving element may be formed into an annular groove disposed around the projection lens 3 and the optical fibers may be formed into a bundle having a cylindrical end to fit the annular light receiving element. Or, as shown in FIG. 6, a plurality of small light receiving elements 8 may be provided around the projection lens 3. In the latter case, a plurality of optical fiber bundles 9 are connected between the light detector and the light receiving element 8.

In detail, as shown in FIG. 6, a plurality of light receiving elements 8 are arranged on a ring mounted around the projection lens 3. One end of the optical fiber bundle 9 is connected to the light receiving element 8, and the other end (divided into three divisional bundles) is connected to the light detectors. The three divisional bundles are connected with three light detectors 5, 5', 5'', respectively. The light detectors 5, 5', 5'' consist of bundle collectors 12, 12', 12'', color filters 11, 11', 11'', and sensors 10, 10', 10''. The bundle collector 12 collects the divisional bundles of optical fibers from all the light receiving elements 8. The color filter 11 filters the light through the optical fibers so that the sensor 10 detects the filtered color light. The reference numeral 11 indicates a red filter, 11' a green filter, and 11'' a blue filter. Accordingly, the light sensor 10 detects the red component of the dispersed light from the negative film N, the sensor 10' detects the green component of the dispersed light from the negative film N, and the sensor 10'' detects the blue component of the dispersed light from the negative film N.

Referring to FIG. 7 showing the cross section of the main part of the color photography printing apparatus in accordance with the present invention, the light receiving element 8 is in the form of a conical shape and the internal surface of the conical plane thereof is coated with aluminum vaporized thereon. Thus, the efficiency of light receiving is increased. The axis of the cone of conical surface is of course directed toward the negative film N (printing light source).

The light receiving elements 8 are disposed between the negative film N and the photographic paper to be printed, and around the projection lens 3. However, the light detectors are positioned far away from the light path. Therefore, the light detector is not affected by the electromagnetic force or other constructions incorporated in the apparatus. And since the optical fiber is divided into three bundles to transmit the dispersed light into three divisional branches in order to detect the color density information separately for three colors at the same time, there is no need to employ an electromagnetic shutter for operation of the color filters.

It is possible to obtain a desired balance in colors by making the ratio of the thickness of the divisional bundles in desired way.

What is claimed is:

1. In a color photography printing apparatus including a light source for exposure, a condenser lens system for condensing the light from the light source onto the negative film, a projection lens system disposed between the negative film and the photographic paper to be printed, the improvement comprising: light-receiving elements disposed circumferentially around said projection lens system, an optical fiber bundle connected at one end thereof to each of said light receiving elements, and defining three divisional bundles at the other end, and light detectors connected to respective divisional bundles of optical fibers for detecting color density of three different colors.

2. The color photography printing apparatus as defined in claim 1 wherein said light detectors include respective different color filters.

3. The color photography printing apparatus as defined in claim 1 wherein each light receiving element comprises an annular groove facing said light source.

4. The color photography printing apparatus as defined in claim 1 wherein said light receiving elements comprise a plurality of conical recesses arranged around said projection lens system.

5. The color photography printing apparatus as defined in claim 4 wherein said plurality of conical recesses are uniformly disposed on a ring defining the projection lens aperture.

* * * * *